2,864,720

TRANSFER SHEET COATED WITH A COMPOSITION CONTAINING A SALT AND A HYDROTROPE

Richard G. Maguire, Chicago, and Glen W. Hedrick, Glen Ellyn, Ill., assignors to Ditto, Incorporated, Chicago, Ill., a corporation of West Virginia No Drawing. Application October 29, 1954
Serial No. 465,627

3 Claims. (Cl. 117—36)

This invention relates to a transfer sheet or carbon paper and includes the transfer composition or ink.

The carbon paper and ink of this invention are particularly suitable for use in chemical reaction type direct or spirit duplicating processes such as, for example, the process disclosed and claimed in our co-pending application Serial No. 233,106, filed June 22, 1951, of which this application is a continuation in part; and the co-pending application of Glen W. Hedrick, Serial No. 465,626, filed October 29, 1954. The carbon paper or ink can be used to produce a master sheet having an image thereon of a composition containing a heavy metal salt such as nickel, copper, cobalt sulfates or sulfonates. This master sheet is then moistened with a solvent for the salt, and the wet sheet is contacted with copy sheets whereupon some of the image material is transferred to the copy sheets and reacts with a reagent such as, for example, rubeanic acid or glyoxime in or on the copy sheets to produce a water insoluble dye image on the copy sheets.

The duplicating fluids generally used to transfer image material from the master to the copy sheet comprise water, alcohols or mixtures thereof. Usually the fluid consists of a mixture of ethyl alcohol, methyl alcohol and water. In the rubeanic acid duplicating process tetra hydro furfuryl alcohol is preferably also present. The transfer sheet and ink herein described are particularly suitable for making masters for use in duplicating processes in which the duplicating or transfer fluid is or contains water or alcohols.

In accordance with the invention the transfer sheet comprises a base sheet coated with a transfer composition comprising oleaginous and waxy material, a metal salt and a hydrotrope. The hydrotrope gives copies in which the intensity is stronger than when it is omitted from the composition.

Hydrotropes are substances which are soluble in both water and hydrocarbons and are characterized by the fact that when present in minor amount in water a large amount of hydrocarbon can be dissolved therein. Suitable hydrotropes include sodium cymene sulfonates, potassium xylene sulfonates, alkali metal tetra hydronaphthalene sulfonates, and butyl naphthalene sulfonates.

Surface active agents such as fatty alcohol sulfates (Duponol ME), ethylene oxide condensation products of alkalated phenols (Igepal CA) can be included, and aid in giving a good dispersion of the waxes, oils, and nickel salt.

Any heavy metal salt may be used including nickel sulfate tetra hydrate, nickel benzene disulfonate hexa hydrate, nickel sulfate hexahydrate, nickel chloride, nickel formate, and the copper, cobalt, iron and vanadium salts corresponding to the nickel salts. Also the other salts used for color reactions may be used such as sodium and ammonium vanadates.

The oleaginous and waxy material can be those commonly used to make carbon paper, including mineral oil, lanolin, bees wax, carnauba wax, castor oil and the like. The proportions are made to give transfer on contact with the help of a type writer.

The proportion of heavy metal salt in the composition can vary widely, and may range from 10% to 80% by weight of the composition, the remainder being oleaginous and waxy material with a minor amount such as 2% to 20% of hydrotrope. The surface active agents when used are also present in minor amounts such as ½% to 10%.

The following examples are given to illustrate the invention:

| Example | 1 | 2 | 3 | 4 |
|---|---|---|---|---|
| Nickel sulfate hexahydrate | 55.08 | 52.71 | 52.62 | 47.0 |
| Alkaterge C (substituted oxazolines) | .92 | .87 | .87 | .97 |
| Red Z oil (mineral oil) | 18.23 | 17.33 | 17.54 | 19.61 |
| Lanolin | 2.76 | 2.62 | 2.63 | 2.94 |
| Gum arabic | .92 | .87 | .87 | .97 |
| Bees wax | 1.83 | 1.74 | 1.74 | 1.94 |
| Carnauba wax | 10.09 | 13.73 | 14.02 | 15.68 |
| Castor oil | 3.49 | 5.56 | 4.49 | 5.02 |
| Igepal CA (ethylene oxide condensation product with an alkalated phenol) | 2.32 | .83 | .74 | .97 |
| Sodium p-cymene sulfonate | 4.36 | 4.15 | 2.16 | 4.90 |
| Duponol ME dry (sodium lauryl sulphate) | 0 | 0 | 2.16 | 0 |

The transfer sheet consists of a base sheet of tissue paper or other sheet material having thereon a transfer coating of a waxy or oleaginous material containing a nickel salt. The transfer sheet may be made by applying the ink composition in hot molten condition at viz. 80–85° C. on the base sheet and then cooling and solidifying.

The ink formulations like the above are illustrative and variations may be made. The essential ingredients are the metal salt and a wax or solid oleaginous material. The metal salt is present in amount sufficient to give legible multiple copies when copy sheets are contacted with the master, viz., 10% by weight to 80% by weight nickel salt. Although the formula variations in the Examples 1 to 4 are not great, the transfer sheets prepared from the inks vary greatly in the length of run. The first gives 150 to 200 copies while the fourth will give only 50 to 60 copies. The second yields 100 to 125 copies and the third 60 to 80 copies.

Alkaterge C is used as a dispersing agent for the salt in the oily vehicle and preferably is used in from 1 to 3 percent. The oleaginous materials such as the mineral oil, lanolin, and castor oil, and the waxy material such as beeswax and carnauba wax are important parts of the vehicle and to a certain extent can be varied to control hardness of the finished ink. The total amount of these materials should vary only a few percent, but variation of the components individually is possible. Given a satisfactory vehicle composed of the above ingredients and the salt, the working properties of the carbon can be controlled by varying the amount of nickel salt, Igepal, sodium p-cymene sulfonate and Duponol. Of these, sodium p-cymene is important and has two functions, viz., controlling hardness of the ink with resultant sharpness of write and its hydrotropic properties. Inks as shown in the examples would all be softer than ordinarily desirable without this material. This material is a hydrotropic agent and aqueous solutions have the property of being able to dissolve hydrocarbons. It is believed the beneficial effect copywise of this material is due to this property, since intensity of copy is stronger when it is used.

For long run transfer sheets, 300 to 500 copies, the formulation of Example 2 is particularly good if the nickel sulfate is replaced by anhydrous nickel formate. Copper and cobalt salts work similarly to nickel sulfate but different colored copies are obtained. The first gives a much greener black than nickel salts and the last gives a yellow copy.

Inks using m-nickel benzene disulfonate are given in Examples 5 through 8.

| Example | 5 | 6 | 7 | 8 |
|---|---|---|---|---|
| Nickel m-benzene disulfonate hexahydrate | 58.80 | 52.72 | 60.99 | 24.03 |
| Alkaterge C | .92 | .89 | .90 | .83 |
| Red Z oil | 16.98 | 17.54 | 16.64 | 16.36 |
| Lanolin | 2.42 | 2.63 | .98 | .66 |
| Gum arabic | .92 | .87 | .90 | .83 |
| Bees wax | 1.83 | 2.64 | 1.79 | 1.66 |
| Carnauba wax | 10.15 | 13.16 | 9.95 | 9.24 |
| Castor oil #3 | 3.89 | 4.50 | 3.82 | 3.33 |
| Igepal CA extra | .73 | .74 | .71 | .88 |
| Sodium p-cymene sulfonate | 1.38 | 2.16 | 1.35 | 1.38 |
| Duponol ME dry | 1.99 | 2.16 | 1.97 | 1.99 |
| Nickel sulfate tetrahydrate |  |  |  | 38.81 |

With nickel benzene disulfonate variations in formulations like those discussed in relation to Examples 1 to 4 are similar. Thus essentially the composition is a solid oleaginous and waxy material containing a substantial amount of the nickel salt. However, it has been found that variations in lanolin and Igepal are more important than in the other type inks. It is desirable to have the lanolin content below 2 percent and preferably below 1 percent.

The maximum amount of Igepal for the preferred composition is about 2 percent. Inks of Examples 5 and 7 give transfer sheets which yield 50 to 75 copies. Example 6 will result in an appreciably shorter run and Example 8 is appreciably longer. The latter ink is made from a mixture of salts. Nickel sulfate tetrahydrate is used in order to increase the total nickel content of the ink and consequently increase the length of run.

The following other nickel salts of organic sulfo and sulfo carboxy acids can be substituted in Examples 5–8 for nickel benzene disulfonate and work almost as well or as well as this compound:

Nickel phenol disulfonate
Nickel sulfobenzoate
Nickel naphthalene trisulfonate
Nickel 1,5-naphthalene disulfonate
Nickel 2,7-naphthalene disulfonate
Nickel anisole disulfonate
Nickel 4,4' diphenyl disulfonate
Nickel 8-amino-1-naphthol disulfonate
Nickel 2-amino-p-benzene disulfonate
Nickel 1-naphthol-3,6-disulfonate
Nickel toluene disulfonate
Nickel butane sulfonate
Nickel hexane sulfonate
Nickel butane sulfate
Nickel benzene tri sulfonate
Nickel o-benzene disulfonate
Nickel p-benzene disulfonate Any nickel, copper or cobalt organic sulfonate or alkane sulfate can be used but methane and ethane sulfonates and sulfates have the disadvantage of being hygroscopic. The mono-sulfonates of benzene and naphthalene have poor solubility in alcohols compared to the di- and tri-sulfonates, and while operable are not preferred.

It is obvious that the important factors in the selection of a salt are as stated before and are as follows:

(1) Solubility.
(2) Percentage composition of nickel.
(3) Stability in high relative humidity.

Copper and cobalt salts like the above nickel salts can be used in the process and for certain cases it is desirable to use mixed salts such as a mixture of copper and nickel salts and also mixed salts such as nickel copper benzene disulfonate.

Examples of fluid to be used with the transfer sheets are:

| Example | 9 | 10 | 11 |
|---|---|---|---|
|  | Percent | Percent | Percent |
| Methanol | 20 | 43.3 | 70 |
| Water | 30 | 26.7 | 15 |
| Alkanol amine | 10 | 10.0 | 5 |
| Tetrahydrofurfuryl alcohol | 20 | 10.0 | 10 |
| Diethylene glycol | 20 | 10 | 0 |
|  | 100 | 100 | 100 |

Fluid of Example 9 is very effective with transfer sheets prepared with inks in Examples 1 to 4; Example 10 in inks of Examples 5 to 8; Example 11 in inks of Examples 5 to 7. Examples 10 and 11 are not very effective with inks of Examples 1 to 2. A discussion of alkanol amines has been made. It is a significant part of the fluid. Alkanol amines are also effective in causing decomposition of residual rubeanic acid and thereby have a bleaching effect on the paper. The fluid as a whole has a synergistic effect. Water is also important and must be held between 10 and 35 percent. Methanol may be varied widely as shown in the examples. Substitution of an appreciable amount of methanol with ethanol, isopropanol or propanol is reflected in weaker copies. Tetrahydrofurfuryl alcohol is quite specific in its properties, probably because it is an exceptionally good solvent for rubeanic acid. Diethylene glycol may be substituted by glycerine, ethylene glycol, propylene glycol, cellosolve and the like. Cellosolve and similar compounds can be used as substitutes for the furfuryl alcohol but a substantial decrease in copy strength results.

A straight alcohol type solvent like that used for direct processes in commerce today will give copies but is nowhere near as effective as the fluids above described.

The copy paper is an important part of the process. The physical properties of the paper relative to porosity, oil bleed, smoothness, gloss and opacity are important to the process. These must be correlated with the fluid used, type of master, ink formulation of transfer sheet, and speed copies made. The fluid cannot penetrate into the paper too rapidly, otherwise the fluid will not be at the surface to contact the master and dissolve the correct amount of salt for suitable copy. If too much fluid is present, the master will be depleted too rapidly.

The copy results, therefore, are related to the quality of the transfer sheet, the fluid, the copy paper and in a lesser extent to the master paper and duplicating machine.

For the cleanest process it is desirable to incorporate the rubeanic acid in the copy paper. For economical reasons it is desirable to mix the rubeanic acid with the starch or substance used for topsizing the paper. For this it is essential that the rubeanic acid be dispersible in water and to do this the rubeanic acid is ground wet in a ball mill or hammer mill in the presence of Tamol NNO (isopropyl naphthalene sulfonate) or other dispersing agents until the particle size has been reduced to a minimum of 0.5 micron in diameter, a maximum of 15 microns with the aggregate (90%) around 2 to 3 microns. With this type dispersion the tendency for rubeanic acid to settle in the size storage tank and equipment is nihil.

The concentration of rubeanic acid on the final paper is around 0.2 percent. The optimum concentrations are 0.1 to 0.3 percent by weight.

The rubeanic acid can be applied from a solvent such as acetone, methanol, etc. This method, although suitable, is not as convenient and economical as the above.

It has also been found that rubeanic acid can be carried in the fluid.

Another variation of the process is the contacting of the master with copy paper and applying rubeanic acid by solvent afterwards. By use of proper mechanical equipment, the process is very satisfactory.

It has been found that derivatives of rubeanic acid may be used, such as dimethyl and diethyl, dihydroxyethyl, dibenzyl and the like. These materials produce different colors with metal ions and only the latter approaches black, a blue violet.

Although the present invention has been described with particular reference to the specific details of certain embodiments thereof, it is not intended that such details shall be regarded as limitations upon the scope of the invention except insofar as included in the accompanying claims.

We claim:

1. A carbon paper consisting essentially of a base sheet having a transfer coating thereon consisting essentially of from 10 percent to 80 percent by weight of a nickel salt, adapted to react with rubeanic acid, dispersed in oleaginous and waxy material containing from 2 to 20 percent by weight of a hydrotropic aryl sulphonate.

2. The carbon paper of claim 1 in which the hydrotropic aryl sulphonate of the transfer composition is an alkali metal cymene sulphonate.

3. The carbon paper of claim 1, in which the nickel salt of the transfer composition is a nickel sulphonate.

References Cited in the file of this patent

UNITED STATES PATENTS

| | | |
|---|---|---|
| 437,780 | Higgins | Oct. 7, 1890 |
| 1,097,981 | Krapf | May 26, 1914 |
| 1,906,962 | Heckel | May 2, 1933 |
| 2,038,486 | Glass | Apr. 21, 1936 |
| 2,139,092 | Nerdlick | Dec. 6, 1938 |
| 2,240,031 | Bour | Apr. 29, 1941 |
| 2,316,340 | Kohn | Apr. 13, 1943 |
| 2,345,142 | Muller | Mar. 28, 1944 |
| 2,357,948 | Gessler et al. | Sept. 12, 1944 |
| 2,377,172 | Murphy | May 29, 1945 |
| 2,585,531 | Bernfeld et al. | Feb. 12, 1952 |
| 2,595,158 | McCue et al. | Apr. 29, 1952 |
| 2,663,655 | Miller et al. | Dec. 22, 1953 |
| 2,663,656 | Miller et al. | Dec. 22, 1953 |
| 2,671,734 | Rosenblum | Mar. 9, 1954 |
| 2,727,825 | Webber | Dec. 20, 1955 |

FOREIGN PATENTS

| | | |
|---|---|---|
| 24,606 | Great Britain | of 1903 |
| 279,403 | Great Britain | Mar. 29, 1928 |

OTHER REFERENCES

Schwartz-Perry: "Surface-Active Agents" (pages 117, 308), pub. 1949, Reinhold.